(12) United States Patent
Baek et al.

(10) Patent No.: US 11,722,942 B2
(45) Date of Patent: *Aug. 8, 2023

(54) METHOD AND APPARATUS FOR CONTROLLING PACKET TRANSMISSION

(71) Applicant: Samsung Electronics Co., Ltd., Suwon-si (KR)

(72) Inventors: Sangkyu Baek, Yongin-si (KR); Anil Agiwal, Suwon-si (KR); Hyunjeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,700

(22) Filed: Jun. 23, 2022

(65) Prior Publication Data

US 2022/0361074 A1 Nov. 10, 2022

Related U.S. Application Data

(63) Continuation of application No. 16/621,991, filed as application No. PCT/KR2018/006625 on Jun. 12, 2018, now Pat. No. 11,375,427.

(30) Foreign Application Priority Data

Jun. 15, 2017 (KR) .................. 10-2017-0076153

(51) Int. Cl.
*H04W 36/26* (2009.01)
*H04L 1/18* (2023.01)
(Continued)

(52) U.S. Cl.
CPC .............. *H04W 36/26* (2013.01); *H04L 1/18* (2013.01); *H04L 1/22* (2013.01); *H04W 12/04* (2013.01);
(Continued)

(58) Field of Classification Search
CPC ..... H04W 36/26; H04W 12/04; H04W 12/08; H04W 28/04; H04W 28/06;
(Continued)

(56) References Cited

U.S. PATENT DOCUMENTS

| 10,972,938 B2 | 4/2021 | Mok et al. |
| 2015/0215987 A1 | 7/2015 | Kim et al. |

(Continued)

FOREIGN PATENT DOCUMENTS

| CN | 105659690 A | 6/2016 |
| CN | 105706387 A | 6/2016 |

(Continued)

OTHER PUBLICATIONS

Extended European Search Report dated May 13, 2020, issued in a counterpart European Application No. 18818952.6-1205/3627882.

(Continued)

*Primary Examiner* — Justin T Van Roie
(74) *Attorney, Agent, or Firm* — Jefferson IP Law, LLP

(57) ABSTRACT

The purpose of the present invention is to provide a method for increasing data transmission efficiency when performing packet duplication. A method for a terminal in a wireless communication system according to the present invention comprises the steps of: performing protocol data convergence protocol (PDCP) duplication in which an identical PDCP protocol data unit (PDU) is transmitted to a base station through each of a first logical channel and a second logical channel; when a request for retransmission of the PDCP PDU which has been transmitted through the second logical channel is received from the base station, retransmitting the PDCP PDU to the base station; and when the PDCP PDU has been retransmitted a predetermined number of times or more, receiving, from the base station, information indicating deactivation of the PDCP duplication.

16 Claims, 27 Drawing Sheets

(51) Int. Cl.
*H04L 1/22* (2006.01)
*H04W 12/04* (2021.01)
*H04W 12/08* (2021.01)
*H04W 28/04* (2009.01)
*H04W 28/06* (2009.01)
*H04W 36/00* (2009.01)
*H04W 80/08* (2009.01)

(52) U.S. Cl.
CPC ........... *H04W 12/08* (2013.01); *H04W 28/04* (2013.01); *H04W 28/06* (2013.01); *H04W 36/0027* (2013.01); *H04W 36/0055* (2013.01); *H04W 80/08* (2013.01)

(58) Field of Classification Search
CPC ......... H04W 36/0027; H04W 36/0055; H04W 80/08; H04L 1/18; H04L 1/22
See application file for complete search history.

(56) References Cited

U.S. PATENT DOCUMENTS

| | | |
|---|---|---|
| 2016/0057800 A1 | 2/2016 | Ingale et al. |
| 2016/0183158 A1 | 6/2016 | Decarreau et al. |
| 2016/0234714 A1 | 8/2016 | Basu Mallick et al. |
| 2016/0255619 A1 | 9/2016 | Yi et al. |
| 2016/0255675 A1 | 9/2016 | Van Lieshout et al. |
| 2016/0338132 A1 | 11/2016 | Uchino et al. |
| 2018/0098250 A1* | 4/2018 | Vrzic ............... H04W 36/0016 |
| 2018/0213439 A1 | 7/2018 | Uchino et al. |
| 2018/0324642 A1* | 11/2018 | Yu .................. H04L 5/0053 |
| 2019/0268799 A1 | 8/2019 | Hong et al. |
| 2020/0037151 A1 | 1/2020 | Du et al. |

FOREIGN PATENT DOCUMENTS

| | | |
|---|---|---|
| WO | 2015/030483 | 3/2015 |
| WO | 2015/064931 A1 | 5/2015 |
| WO | 2017/051623 A1 | 3/2017 |

OTHER PUBLICATIONS

Nokia et al: "Duplication Impacts to MAC", 3GPP Draft; R2-1704272 Duplication Impacts to MAC, 3rd Generation Partnership Project (3GPP), vol. RAN WG2, No. XP051274850; May 14, 2017, Hangzhou, China. Retrieved from the Internet: URL:http://www.3gpp.org/ftp/Meetings_3GPP_SYNC/RAN2/Docs/.

Nokia et al: "Duplication Impacts to RLC", 3GPP Draft; R2-1704275 Duplication Impacts to RLC, 3rd Generation Partnership Project (3GPP), vol. RAN WG2, No. XP051274853; May 14, 2017, Hangzhou, China. Retrieved from the Internet: URL:http://www.3gpp.org/ftp/Meetings_3GPP_SYNC/RAN2/Docs/.

Ericsson: "Controlling of duplication in case of CA", 3GPP Draft; R2-1702753—Controlling of Duplication in Case of CA, 3rd Generation Partnership Project (3GPP), vol. RAN WG2, No. XP051244741; Apr. 3, 2017, Spokane, USA. Retrieved from the Internet: URL:http://www.3gpp.org/ftp/Meetings_3GPP_SYNC/RAN2/Docs/.

ZTE, "Discussion on the frame structure for NR-U", 3GPP Draft, R1-1808318, 3rd Generation Partnership Project (3GPP), 3GPP TSG RAN WG1 Meeting #94, Gothenburg, Sweden, Aug. 20-24, 2018.

ETRI, "Discussion on IAB resource multiplexing enhancements", 3GPP Draft, R1-2009220, 3rd Generation Partnership Project (3GPP), 3GPP TSG RAN WG1 Meeting #103-e, e-Meeting, Oct. 26-Nov. 13, 2020.

Indian Office Action dated Mar. 2, 2022, issued in Indian Patent Application No. 201937051424.

Chinese Office Action dated Feb. 23, 2023, issued in Chinese Patent Application No. 201880040175.1.

European Office Action dated Mar. 31, 2023, issued in European Patent Application No. 18818952.6.

* cited by examiner

METHOD AND APPARATUS FOR CONTROLLING PACKET TRANSMISSION

CROSS-REFERENCE TO RELATED APPLICATION(S)

This application is a continuation application of prior application Ser. No. 16/621,991, filed on Dec. 12, 2019, which has issued as U.S. Pat. No. 11,375,427 issued on Jun. 28, 2022, which is a U.S. National Stage application under 35 U.S.C. § 371 of an International application number PCT/KR2018/006625, filed on Jun. 12, 2018, which is based on and claims priority of a Korean patent application number 10-2017-0076153, filed on Jun. 15, 2017, in the Korean Intellectual Property Office, the disclosure of which is incorporated by reference herein in its entirety.

TECHNICAL FIELD

The disclosure relates to a method and a device for controlling packet transmission in a mobile communication system.

BACKGROUND ART

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system.

In order to achieve a high data transmission rate, implementation of the 5G communication system in a mmWave band (for example, 60 GHz band) is being considered. In the 5G communication system, technologies such as beamforming, massive MIMO, full-dimensional MIMO (FD-MIMO), array antenna, analog beam-forming, and large-scale antenna technologies are under discussion with the goal of mitigating propagation path loss in the mmWave band and increasing a propagation transmission distance.

Further, in the 5G communication system, technologies such as an evolved small cell, an advanced small cell, a cloud radio access network (cloud RAN), an ultra-dense network, device-to-device communication (D2D), a wireless backhaul, a moving network, cooperative communication, coordinated multi-points (COMP), and received interference cancellation have developed to improve the system network.

In addition, the 5G system has developed advanced coding modulation (ACM) schemes such as hybrid FSK and QAM modulation (FOAM) and sliding window superposition coding (SWSC), and advanced access technologies such as filter bank multi-carrier (FBMC), non-orthogonal multiple access (NOMA), and sparse code multiple access (SCMA).

DESCRIPTION OF INVENTION

Technical Problem

The disclosure provides a method for effectively managing a radio link in the case where the number of retransmissions reaches the maximum when performing packet duplication.

Also, the disclosure provides a method for increasing data transmission efficiency when performing packet duplication.

Also, the disclosure defines a method for generating a security key in a non-standalone (NSA) structure.

Also, the disclosure defines a method for performing integrity checking in a split bearer.

Solution to Problem

In order to solve the problem described above, a method of a terminal a wireless communication system according to one embodiment of the disclosure may include: performing PDCP duplication to transmit an identical protocol data convergence protocol (PDCP) protocol data unit (PDU) through a first logical channel and a second logical channel to a base station; retransmitting, if a request for retransmitting PDCP PDU transmitted through the second logical channel is received from the base station, the PDCP PDU to the base station; and receiving information instructing deactivation of the PDCP duplication from the base station if the number of the PDCP PDU retransmissions becomes equal to or greater than a pre-configured number of times.

A method of a base station in a wireless communication system according to one embodiment of the disclosure may include: transmitting, to a terminal, a message instructing activation of PDCP duplication for transmitting an identical protocol data convergence protocol (PDCP) protocol data unit (PDU) through a first logical channel and a second logical channel; requesting retransmission of the PDCP PDU transmitted through the second logical channel to the terminal; receiving, from the terminal, a report providing notification that the number of the PDCP PDU retransmissions is equal to or greater than a pre-configured number of times; and transmitting information instructing deactivation of the PDCP duplication to the terminal.

A terminal in a wireless communication system according to one embodiment of the disclosure may include: a transceiver; and a controller configured to perform PDCP duplication for transmitting an identical protocol data convergence protocol (PDCP) protocol data unit (PDU) through a first logical channel and a second logical channel to a base station, control the transceiver to retransmit, if a request for retransmitting the PDCP PDU transmitted through the second logical channel is received from the base station, the PDCP PDU to the base station, and control the transceiver to receive information instructing deactivation of the PDCP duplication from the base station if the number of the PDCP PDU retransmissions becomes equal to or greater than a pre-configured number of times.

A base station in a wireless communication system according to one embodiment of the disclosure may include: a transceiver; and a controller configured to transmit, to a terminal, a message instructing activation of PDCP duplication for transmitting an identical protocol data convergence protocol (PDCP) protocol data unit (PDU) through a first logical channel and a second logical channel, request retransmission of the PDCP PDU transmitted through the second logical channel to the terminal, receive a report providing notification that the number of the PDCP PDU retransmissions is equal to or greater than a pre-configured number of times from the terminal, and control the transceiver to transmit information instructing deactivation of the PDCP duplication to the terminal.

Advantageous Effects of Invention

According to an embodiment of the disclosure, it is possible to effectively manage a radio link and increase transmission efficiency during duplicate transmission of a packet.

According to another embodiment of the disclosure, it is possible to generate various security keys in an NSA structure.

According to another embodiment of the disclosure, it is possible to perform integrity checking in a split bearer according to a security attack.

MODE FOR THE INVENTION

Figure 1:
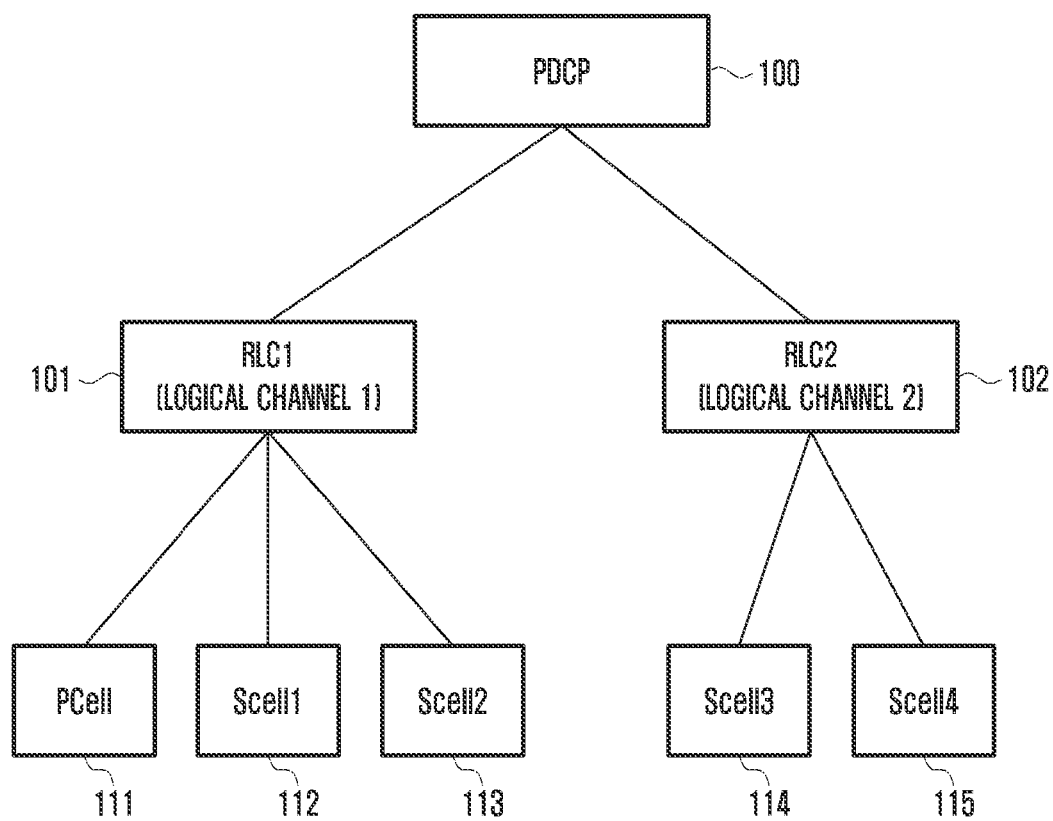
FIG. 1 illustrates a structure in which a packet duplication is performed in carrier aggregation (hereinafter, CA) according to one embodiment of the disclosure.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be made apparent by making reference to the embodiments described below in detail in conjunction with the accompanying drawings. However, the disclosure is not limited to the embodiments set forth below but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

FIG. 1 illustrates a structure in which duplicate packet transmission is performed in carrier aggregation (hereinafter, CA).

"Duplicate packet transmission" signifies that one packet data convergence protocol (PDCP) device 100 duplicates a packet (PDCP protocol data unit (PDU)) and then sends data to two or more radio link control (RLC) devices 101 and 102 to independently perform transmission. One RLC device corresponds to one logical channel.

It is necessary to map a logical channel and a cell in order to effectively perform duplicate packet transmission in a CA environment. In other words, logical channels require restriction on the cell to which data can be sent. FIG. 1 is an example illustrating that logical channel 1 101 can send data to a primary cell (PCell) 111, a secondary cell 1 (SCell) 112, and an SCell 2 113, and logical channel 2 can send data to an SCell 3 114 and an SCell 4 115. A cell is also referred to as a component carrier (hereinafter, CC).

In the case where transmission is not completed even though a certain packet has been maximally retransmitted from an RLC device (when an RETX_COUNT value reaches a maxRetxThreshold in an LTE system), it is determined that a radio link environment is not good. Thus, radio link failure (RLF) is declared, and a terminal performs a procedure for reconfiguring connection to a corresponding base station (master base station or secondary base station).

Figure 2:
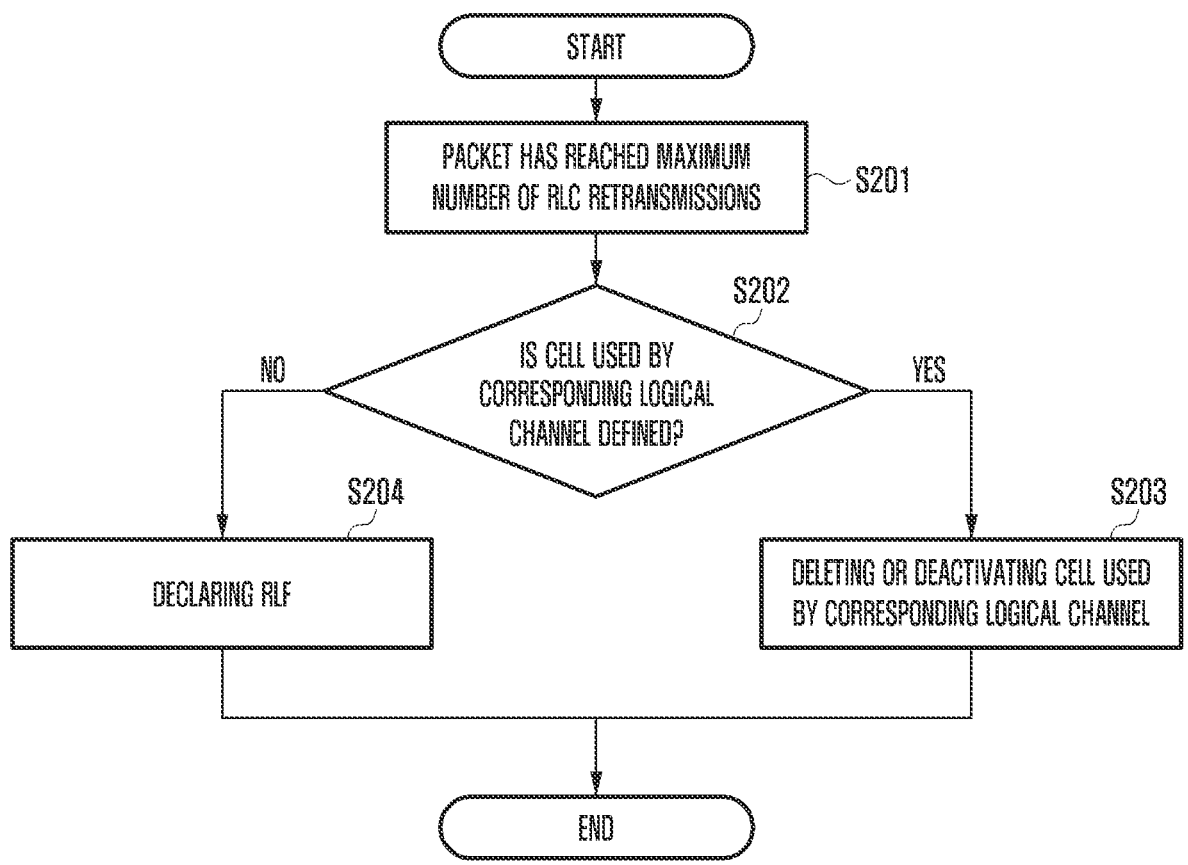
FIG. 2 shows operation in the case where the number of RLC retransmissions reaches the maximum according to one embodiment of the disclosure.

FIG. 2 shows an operation proposed by the disclosure in the case where the number of RLC retransmissions reaches the maximum.

If a packet transmitted by an RLC device reaches the maximum number of RLC retransmissions in S201 (when an RETX_COUNT value reaches a maxRetxThreshold in an LTE system), whether or not a cell used by a corresponding logical channel corresponding to the RLC device is defined may be determined in S202.

As in an embodiment of FIG. 1, if a corresponding logical channel can send data in a certain cell or cells rather than in every cell, only the cell used by the corresponding logical channel may be released/deleted or deactivated in S203. In this case, RLF is not declared, and an RLF operation is not carried out. On the other hand, if a corresponding logical channel can send data in every activated cell, RLF may be declared in S204.

A terminal may notify a base station that only the cell used by the corresponding channel is released/deleted or deactivated. At this time, the base station may be notified through a different cell rather than the cell corresponding to the RLC device having reached the maximum number of RLC retransmissions. According to an embodiment, the RLC device having reached the maximum number of RLC retransmissions may request another RLC device connected to an identical radio bearer (PDCP device) to transmit a corresponding message.

According to an embodiment, deleting or deactivating only the cell used by the corresponding logical channel may also be determined in a base station or another network device. In this case, a terminal may report the situation of the corresponding terminal to a base station to allow the base station to determine whether to delete or deactivate the cell used by the corresponding logical channel. In response to the report from the terminal, the base station may delete or deactivate a cell used by a corresponding logical channel.

The information to be provided to the base station may include an ID of a logical channel having reached the maximum number of retransmissions, a CC index to which a packet is transmitted, an SCell index, a cell ID, a sequence number (SN) of a corresponding packet, and the like.

An instructor for a network node or a cell group may be included in a dual connectivity structure in order to accurately distinguish a logical channel, a CC index, an SCell index, a cell ID, and the like.

If the embodiment of FIG. 2 is applied in the duplicate packet transmission structure of FIG. 1, an operation may be performed as follows.

In the situation where duplicate packet transmission is carried out, if the transmission is not completed even though a packet has been maximally transmitted in RLC 1 or RLC 2, it may not be necessary to renew the entire connection to a base station. For example, in the case where transmission is not completed even though a packet has been maximally transmitted in the RLC 2, it may be determined that a radio link of the SCell 3 and the SCell 4 is not good. Thus, only a connection to the SCell 3 and the SCell 4 may be released, and a connection to the PCell, the SCell 1, and the SCell 2, which are connected to the RLC 1, may remain unchanged.

Figure 3:
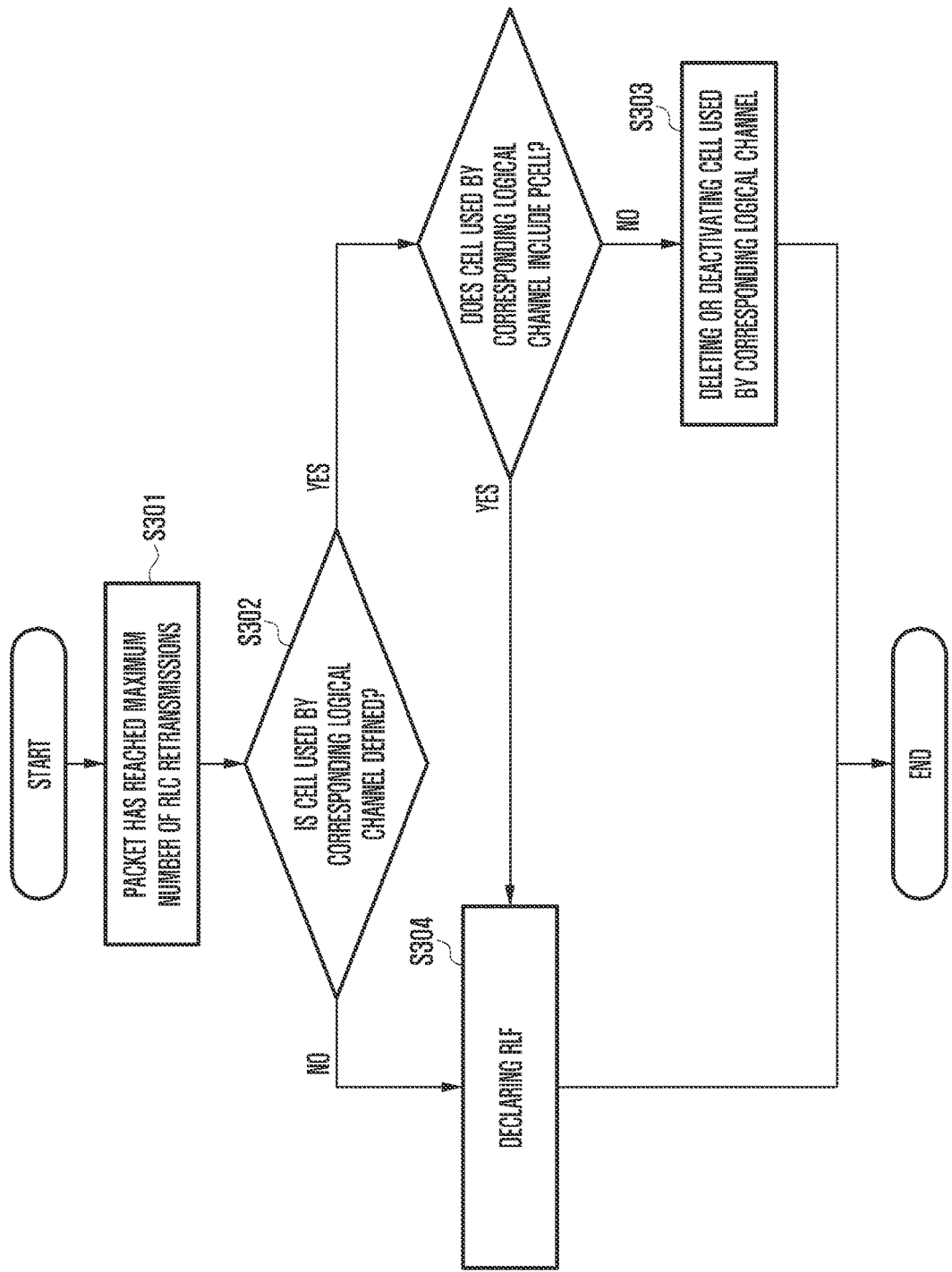
FIG. 3 shows operation in the case where the number of RLC retransmissions reaches the maximum according to one embodiment of the disclosure.

FIG. 3 shows an operation proposed by the disclosure in the case where the number of RLC retransmissions reaches the maximum.

If a packet transmitted by an RLC device reaches the maximum number of RLC retransmissions in S301 (when an RETX_COUNT value reaches a maxRetxThreshold in an LTE system), whether or not a cell used by a corresponding logical channel corresponding to the RLC device is defined may be determined in S302.

As in the embodiment of FIG. 1, if a corresponding logical channel can send data in a certain cell or cells rather than in every cell, and cannot send data in the PCell among these cells, only the cell used by the corresponding logical cell may be released/deleted or deactivated in S303. In this case, RLF is not declared and an RLF operation is not carried out. Even though a corresponding logical channel can send data in a certain cell or cells rather than in every cell, if the corresponding logical channel can send data in the PCell among these cells, RLF may be declared in S304.

In the embodiment of FIG. 3, RLF is not declared and an RLF operation is not carried out if the case corresponds to S303. On the other hand, if a corresponding logical channel can send data in every activated cell, RLF may be declared.

A terminal may notify a base station of deletion, release or deactivation only of a cell used by a corresponding logical channel. At this time, the base station may be notified through a different cell rather than the cell corresponding to the RLC device having reached the maximum number of RLC retransmissions. The RLC device having reached the maximum number of RLC retransmissions according to an embodiment may request another RLC device connected to an identical radio bearer (PDCP device) to transmit the corresponding message.

Whether to delete or deactivate only the cell used by the corresponding logical channel according to an embodiment may be determined by a base station or another network device. In this case, a terminal may report the situation of the corresponding terminal to a base station to allow the base station to determine whether to delete or deactivate the cell used by the corresponding logical channel. In response to the report from the terminal, the base station can delete or deactivate the cell used by the corresponding logical channel.

The information to be provided to the base station may include an ID of a logical channel having reached the maximum number of retransmissions, a CC index to which a packet is transmitted, an SCell index, a cell ID, a sequence number (SN) of a corresponding packet, and the like.

An indicator for a network node or a cell group may be included in a dual connectivity structure in order to accurately distinguish logical channels, CC indexes, SCell indexes, cell IDs, and the like.

If the embodiment of FIG. 3 is applied in the duplicate packet transmission structure of FIG. 1, operation may be performed as follows. In the situation where the duplicate packet transmission of FIG. 1 is carried out, in the case where transmission is not completed even though a packet has been maximally transmitted in the RLC 1 or the RLC 2, it may not be necessary to renew the entire connection to a base station. For example, in the case where transmission is not completed even though a packet has been maximally transmitted in the RLC 2, it is determined that a radio link of the SCell 3 and the SCell 4 is not good. Thus, only the connection to the SCell 3 and the SCell 4 may be released and the connection to the PCell, the SCell 1, and an SCell 2, which are connected to the RLC 1, may remain unchanged.

However, in the case where transmission is not completed even though a packet has been maximally transmitted in the RLC 1, RLF is declared since the RLC 1 is configured to send data using the PCell, and an operation defined after the RLF will be carried out.

Figure 4:
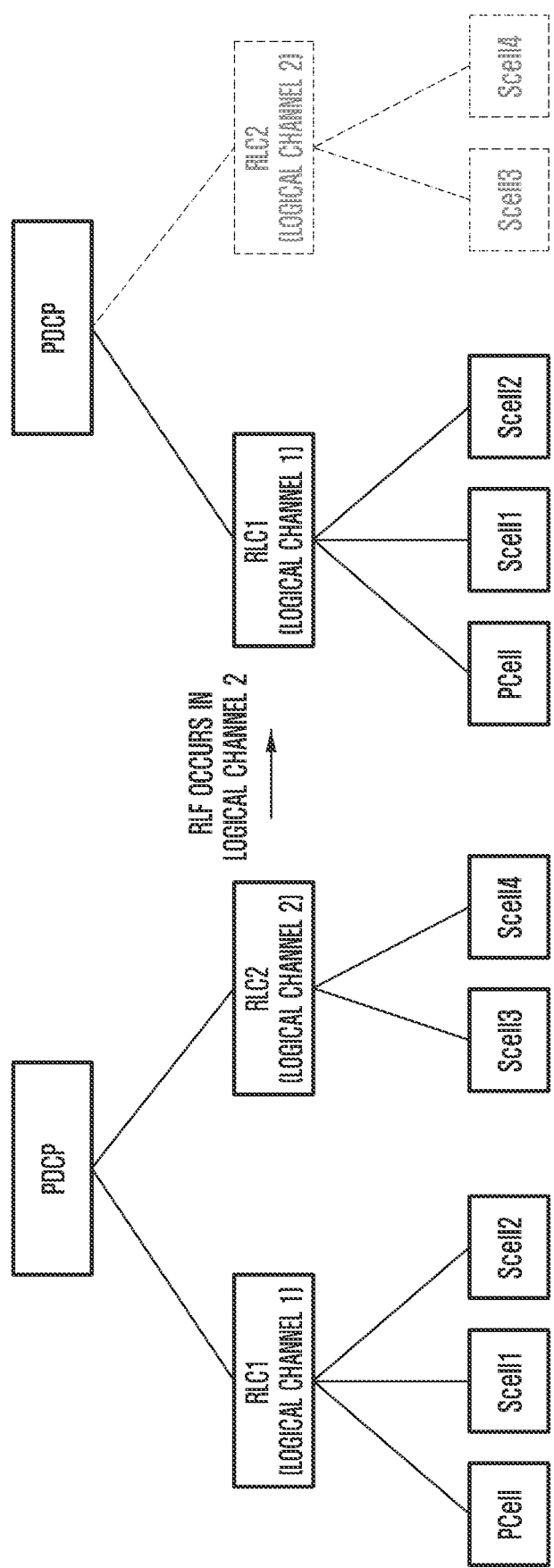
FIG. 4 illustrates operation in case where RLF occurs in a certain logical channel according to one embodiment of the disclosure.

FIG. 4 illustrates an embodiment of operation in the case where RLF occurs in an environment that is limited as to which cells can be used by a logical channel in a duplicate packet transmission structure.

If RLF occurs in RLC 2 corresponding to logical channel 2 in the embodiment of FIG. 4, the RLC 2 may be reset. In another embodiment, logical channel 2 may delete or deactivate an SCell 3 and an SCell 4 through which a packet is transmitted. However, this is not limited to being applied only to a duplicate packet transmission structure and may be equally applied in an environment that is limited as to which cells can be used by a logical channel.

Figure 5:
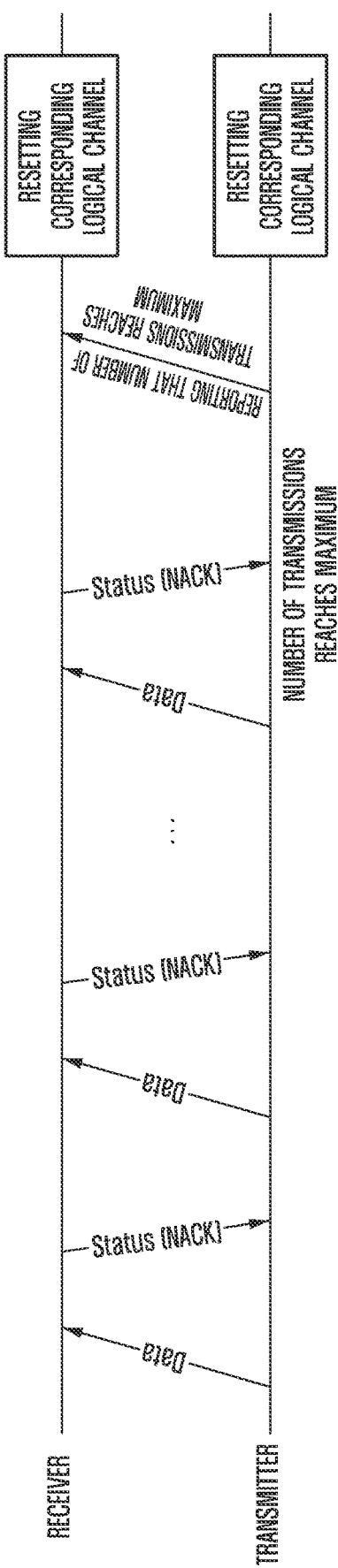
FIG. 5 illustrates operation in the case where the number of RLC retransmissions reaches the maximum according to one embodiment of the disclosure.

FIG. 5 illustrates one embodiment of operation in the chase a packet reaches the maximum number of RLC retransmissions (when an RETX_COUNT value reaches a maxRetxThreshold in an LTE system).

A terminal may notify a base station that the number of RLC retransmissions has reached the maximum. A message reporting that the number of transmissions has reached the maximum is transmitted in the embodiment of FIG. 5. This message may be transmitted to a base station through a different cell rather than a cell corresponding to an RLC device having reached the maximum number of retransmissions.

An RLC device having reached the maximum number of RLC retransmissions according to an embodiment may request another RLC device connected to an identical radio bearer (PDCP device) to transmit a corresponding message. The information to be provided to a base station may include an ID of a logical channel having reached the maximum number of retransmissions, a CC index to which a packet is transmitted, an SCell index, a cell ID, a sequence number (SN) of a corresponding packet, and the like.

After this message is transmitted, a transmitter may reset a corresponding logical channel or an RLC device. After this message is transmitted, the receiver may reset a corresponding logical channel or an RLC device.

The reset of the corresponding logical channel or the RLC device according to an embodiment may be determined by a base station or another network device. In this case, the base station may instruct the reset of the corresponding logical channel or the RLC device after reporting of that the number of transmissions has reached the maximum.

In an embodiment, a CC index, an SCell index, and a cell ID which are included in a message reporting that the number of transmissions has reached the maximum, or a CC or a cell corresponding to at least one thereof may also be deleted or deactivated. The procedure of FIG. 5 may also be applied only to a logical channel that does not transmit a packet using a PCell.

An instructor for a network node or a cell group may be included in a dual connectivity structure in order to accurately distinguish logical channels, CC indexes, SCell indexes, cell IDs, and the like.

Figure 6:
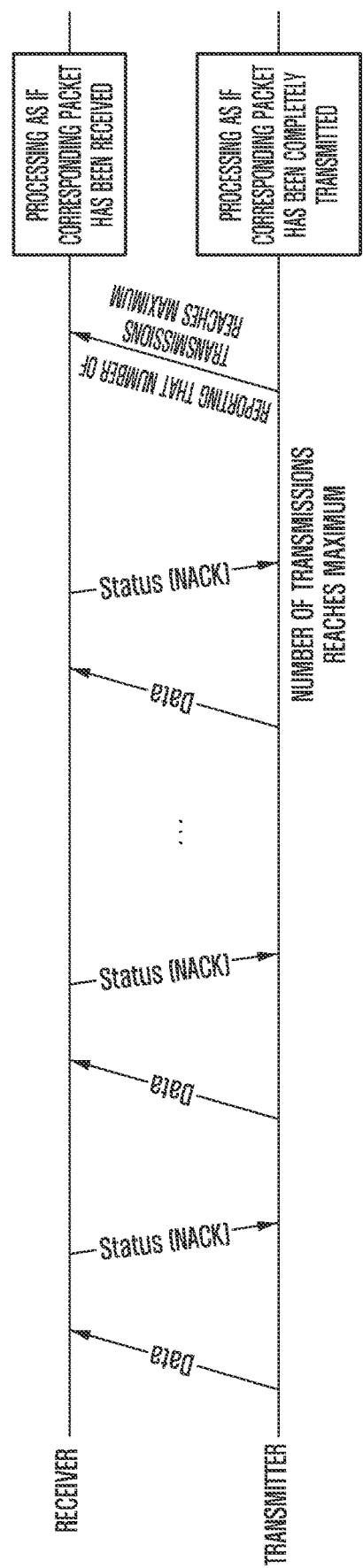
FIG. 6 illustrates operation in the case where the number of RLC retransmissions reaches the maximum according to one embodiment of the disclosure.

FIG. 6 illustrates another embodiment of operation in the case where a packet has reached the maximum number of RLC retransmissions (when an RETX_COUNT value has reached a maxRetxThreshold in an LTE system).

A terminal may notify a base station that the number of RLC retransmissions has reached the maximum. A message reporting that the number of transmissions has reached the maximum is transmitted in the embodiment of FIG. 6. This message may be transmitted to a base station through a different cell rather than the cell corresponding to the RLC device having reached the maximum number of RLC retransmissions. The RLC device having reached the maximum number of RLC retransmissions according to an embodiment may request another RLC device connected to an identical radio bearer (PDCP device) to transmit the corresponding message. In this case, the information to be provided to the base station may include an ID of a logical channel having reached the maximum number of retransmissions, a CC index to which a packet is transmitted, an S Cell index, a cell ID, a sequence number (SN) of the corresponding packet, and the like.

After this message is transmitted, a transmitter may perform processing as if a packet having reached to the maximum number of retransmissions had been completely transmitted and may continue a transmitting/receiving operation. After this message is transmitted, a receiver may perform processing as if a packet having reached to the maximum number of retransmissions had been successfully received and may continue a transmitting/receiving operation.

Whether to perform processing as if a packet having reached the maximum number of retransmissions had been completely transmitted according to an embodiment may also be determined by a base station or another network device. In this case, after a report that the number of transmissions has reached the maximum, the base station may provide instruction to perform processing as if the corresponding packet had been completely transmitted.

In an embodiment, additionally, a CC index, an SCell index, and a cell ID, which are included in a message reporting that the number of transmissions has reached the maximum, or a CC or a cell corresponding to at least one thereof may be deleted or deactivated. The procedure FIG. 6 may also be applied only to a logical channel that does not transmit a packet using a PCell.

An instructor for a network node or a cell group may be included in a dual connectivity structure in order to accurately distinguish logical channels, CC indexes, SCell indexes, cell IDs, and the like.

Figure 7:
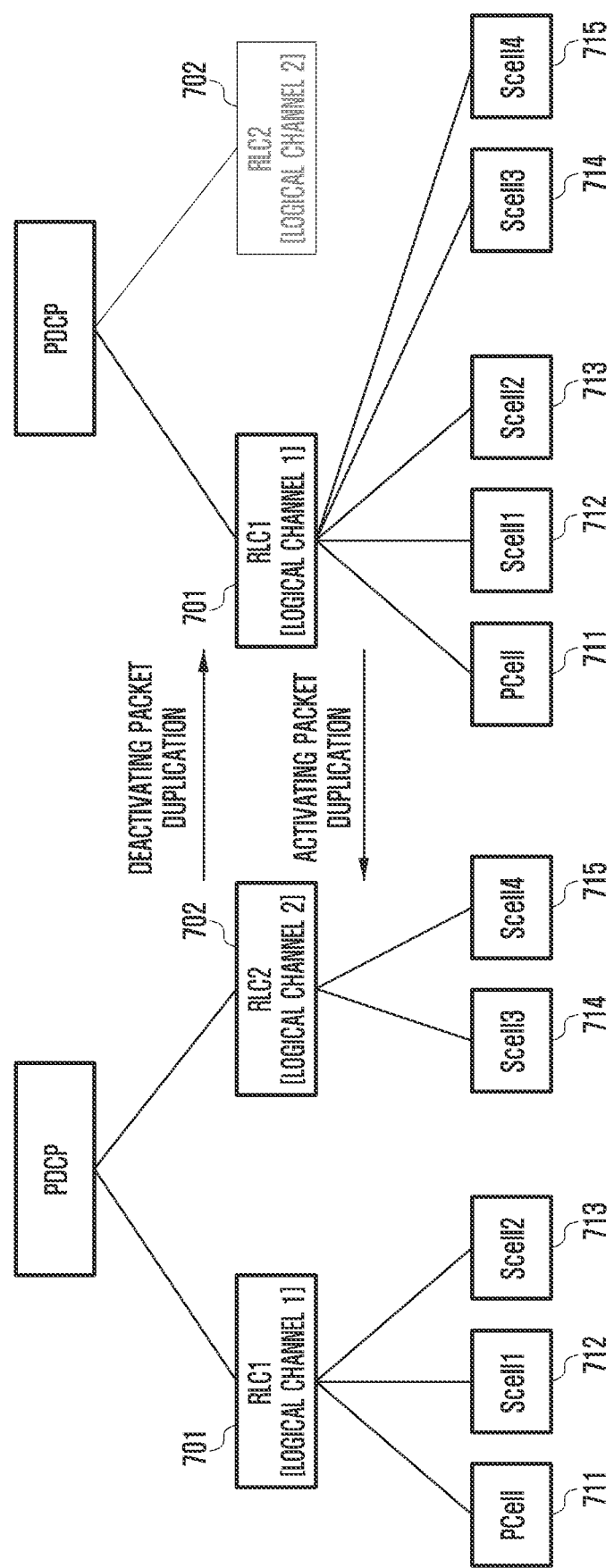
FIG. 7 illustrates a packet transmission structure change in the case of duplicate packet activation and deactivation according to one embodiment of the disclosure.

FIG. 7 illustrates an embodiment in which a cell used by a logical channel to transmit a packet is changed according to duplicate packet activation and deactivation.

If duplicate packet transmission is activated, each of an RLC device and a logical channel corresponding thereto may have a defined cell through which a packet can be transmitted. In the embodiment of FIG. 7, logical channel 1 701 can transmit a packet using a PCell 711, an SCell 1 712, and an SCell 2 713, and logical channel 2 702 can transmit a packet using an SCell 3 714 and an SCell 4 715. However, in the case where only one RLC device can perform packet transmission due to the deactivation of packet duplication, it may not be necessary to limit the cell that can be used to transmit a packet with respect to a logical channel.

If packet duplication is deactivated in the embodiment of FIG. 7, only the RLC 1 701 may perform packet transmission. In this case, logical channel 1 may use all of the PCell 711, SCell 1 712, SCell 2 713, SCell 3 714, and SCell 4 715 to transmit a packet. That is, packet transmission may be carried out through all the activated cells.

If the RLC 2 has remaining packets that should be transmitted and the corresponding packets cannot be destroyed, the RLC 2 may also perform transmission of the corresponding remaining packets. In this case, the packet transmission may be carried out through all activated cells in the same manner in the RLC 1.

Figure 8:
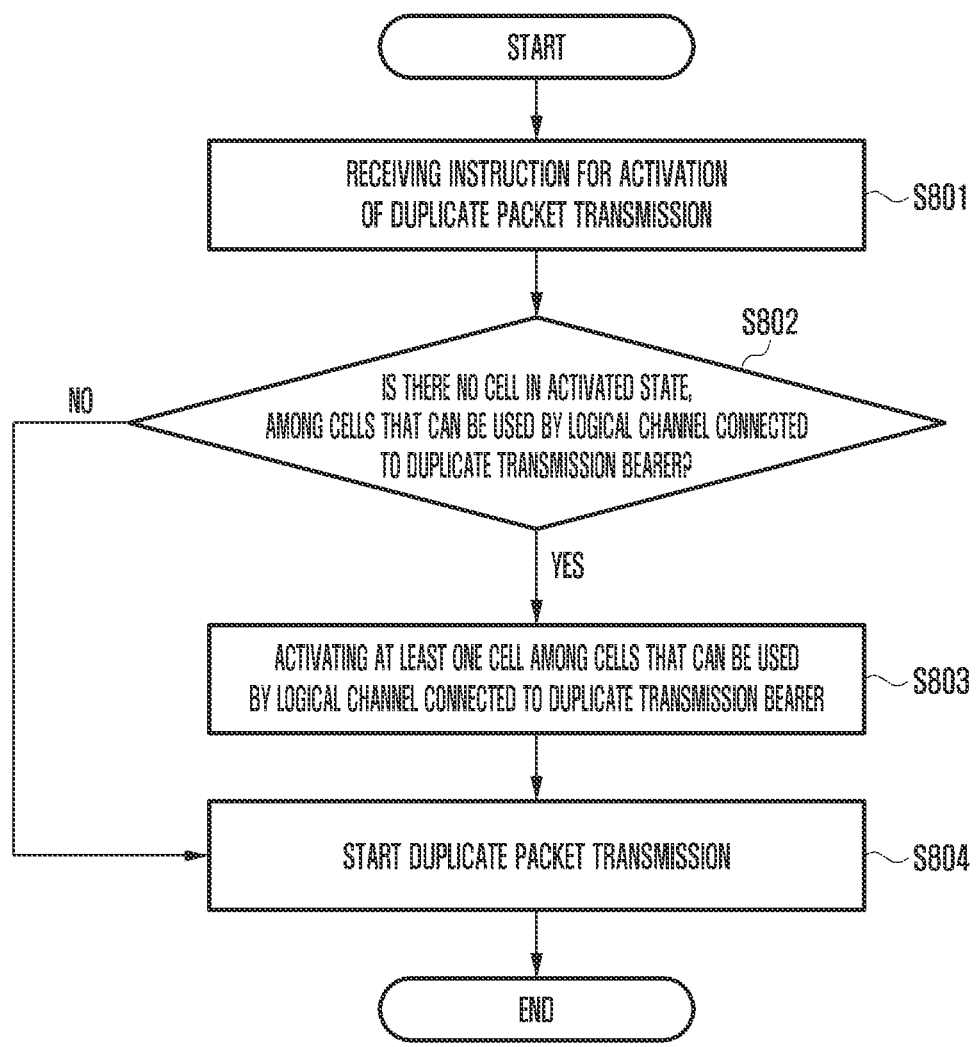
FIG. 8 shows operation in the case of duplicate packet activation according to one embodiment of the disclosure.

FIG. 8 shows an embodiment of operation in the case where duplicate packet transmission is activated.

Duplicate packet transmission may be activated by a medium access control (MAC) control element (CE), a radio resource control (RRC) message, a PDCP control PDU, or the like. A terminal may receive an instruction for activation of the duplicate packet transmission through these messages in S801. In S802, there may be no cells in an activated state among the cells that can be used by a logical channel connected to a duplicate transmission bearer. In the embodiment of FIG. 7, for example, the SCell 3 and the SCell 4 may be in a deactivated state at the time at which duplicate packet transmission is activated.

In this case, at least one cell among the cells that can be used by a logical channel connected to the duplicate transmission bearer may be activated in S803 to start duplicate packet transmission in S804. For example, in the embodiment of FIG. 7, an operation of activating at least one cell among the SCell 3 and the SCell 4 is performed.

Figure 9:
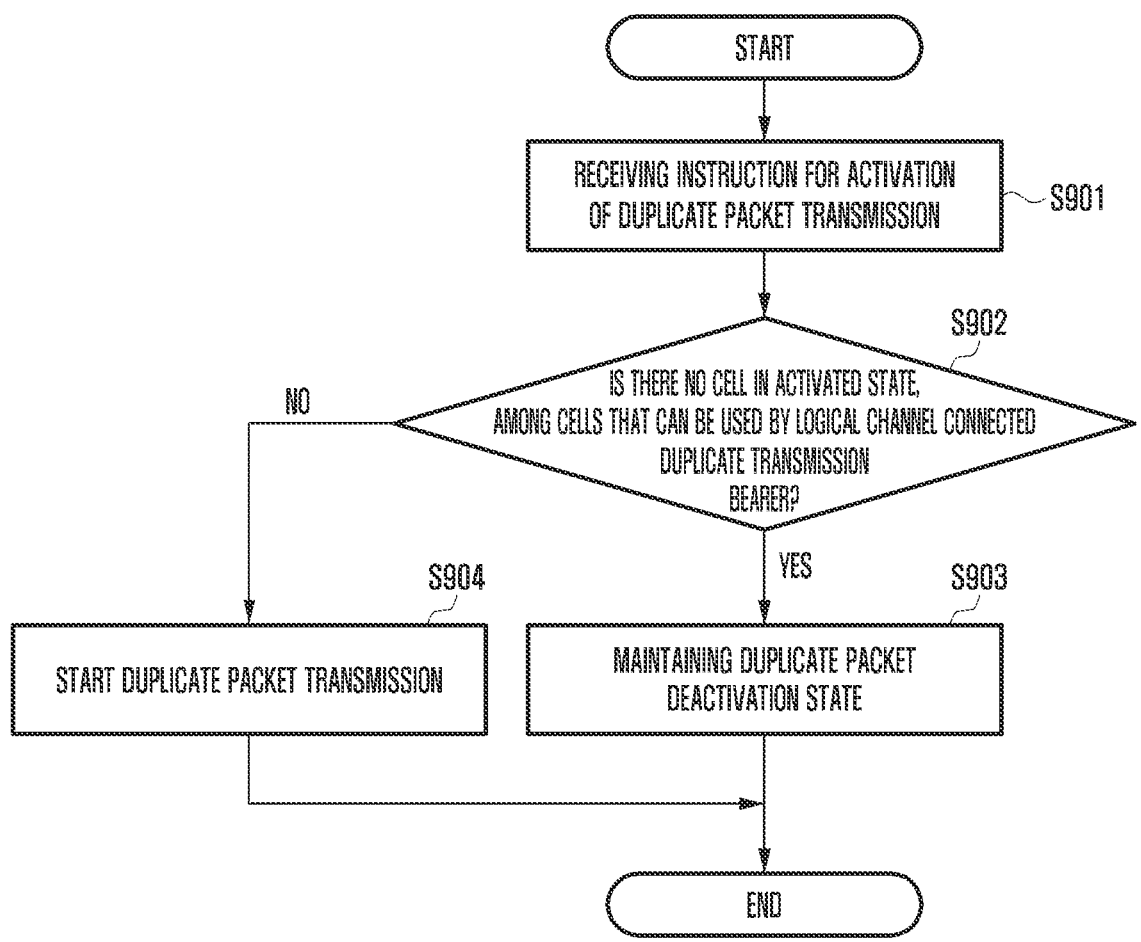
FIG. 9 shows an operation in the case of duplicate packet activation according to one embodiment of the disclosure.

FIG. 9 shows an embodiment of operation in the case where duplicate packet transmission is activated.

Duplicate packet transmission may be activated by a MAC CE, an RRC message, a PDCP control PDU, or the like. A terminal may receive an instruction for activation of duplicate packet transmission through these messages in S901. In S902, there may be no cells in an activated state among the cells that can be used by a logical channel connected to a duplicate transmission bearer. For example, in the embodiment of FIG. 7, the SCell 3 and the SCell 4 may be in a deactivated state at the time at which duplicate packet transmission is activated.

In this case, since duplicate transmission cannot be carried out, the packet duplication-deactivated state may be maintained in S903. Thereafter, in the case where at least one of the cells that can be used by a logical channel connected to a duplicate transmission bearer is activated, duplicate packet transmission may be carried out in S904.

Figure 10:
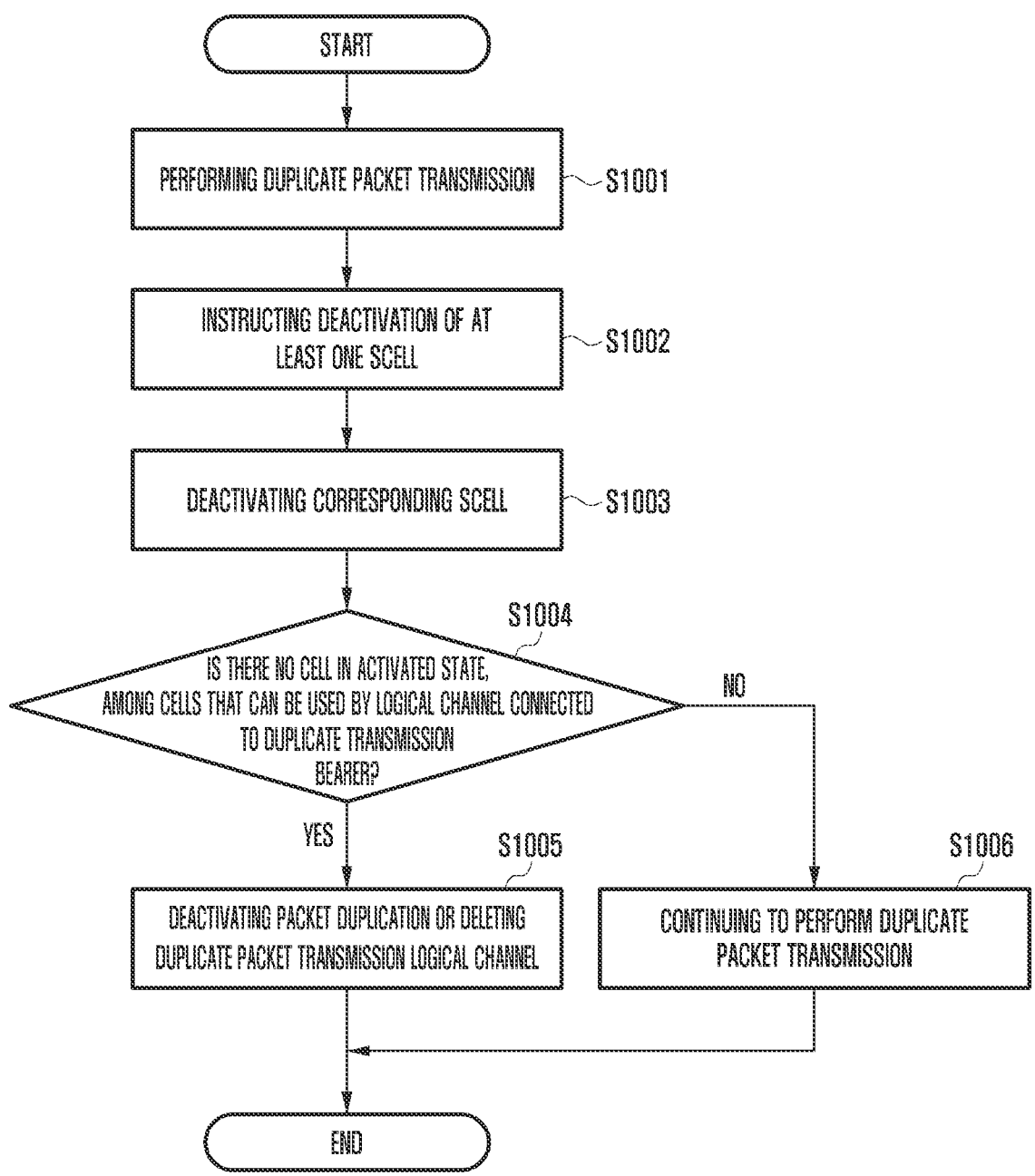
FIG. 10 shows an operation in the case of SCell deactivation according to one embodiment of the disclosure.

FIG. 10 shows an embodiment of operation in the case of receiving an instruction for SCell deactivation when duplicate packet transmission is activated.

In the state where duplicate packet transmission is carried out in S1001, an instruction for SCell deactivation may be received through an MAC CE in S1002. However, the SCell may not be limited to a deactivated state and may be applied to the state where the SCell is released.

A terminal, having received an instruction for SCell deactivation, deactivates the corresponding SCell in S1003. Thereafter, it may be checked in S1004 whether there is an activated cell among the cells that can be used by a logical channel connected to a duplicate transmission bearer. If there is no cell in an activated state in the logical channel, duplicate packet transmission may be deactivated, or a duplicate packet transmission logical channel having no cell through which a packet is sent may be deleted in S1005. Otherwise, performance of the duplicate packet transmission continues in S1006.

FIGS. 11A, 11B, 11C, 11D, and 11E illustrate an embodiment in which a bearer and a user plane protocol stack are configured in a non-standalone (NSA) structure including an LTE-new rat (LTE-NR) coexisting therein. An LTE base station/terminal may be referred to as a master node (MN), and an NR base station/terminal may be referred to as a secondary node (SN).

In addition, a bearer may include a master cell group (MCG) bearer, an MCG split bearer, a secondary cell group (SCG) bearer, and an SCG split bearer. The bearer may be applied both to a data radio bearer (DRB) and to a signaling radio bearer (SRB) that transmit data.

Figure 11A:
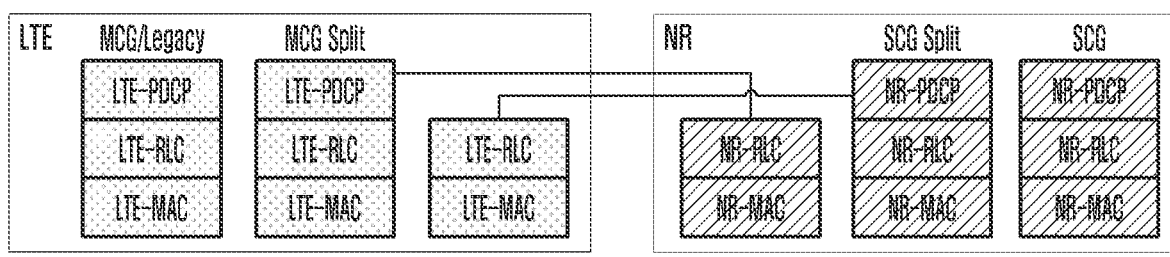
FIGS. 11A, 11B, 11C, 11D, and 11E illustrate a protocol stack structure in an NSA structure according to one embodiment of the disclosure.

FIG. 11A illustrates an example of an LTE and NR protocol stack which remain unchanged.

Figure 11B:
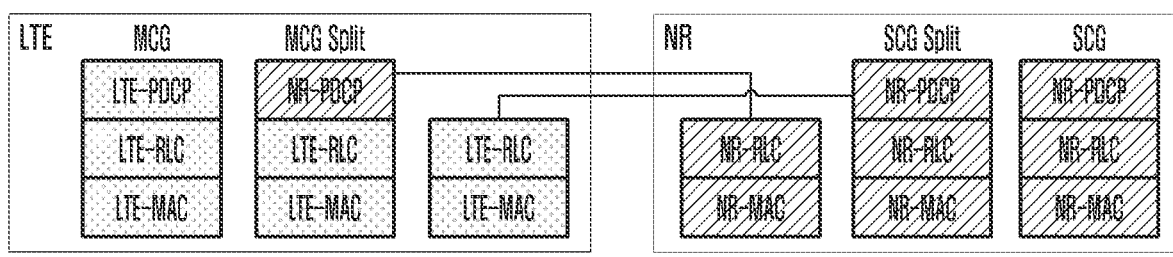

FIG. 11B illustrates an example of an MCG split bearer using NR-PDCP in PDCP. The difference between an MCG split bearer and an SCG split bearer is eliminated inside a terminal.

Figure 11C:
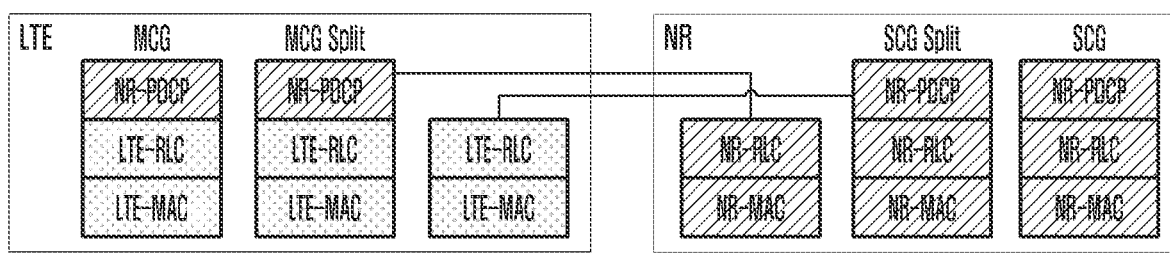

FIG. 11C illustrates an example of an MCG bearer using NR-PDCP in PDCP. All of the bearers in an NSA structure use NR-PDCP in the embodiment of FIG. 11C.

Figure 11D:
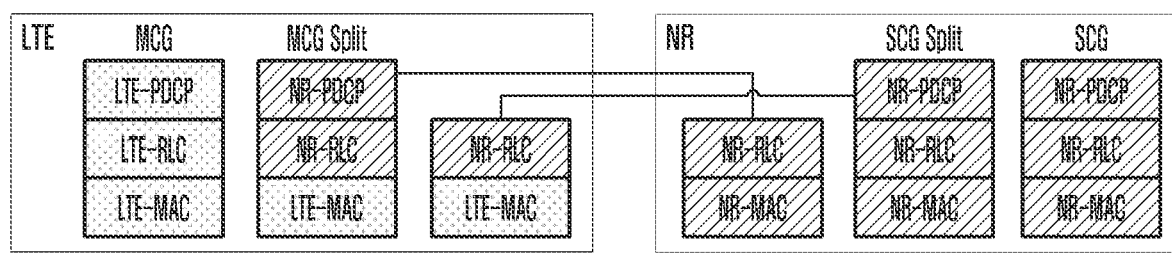

FIG. 11D illustrates an example of a split bearer using NR-PDCP and NR-RLC in PDCP and RLC, respectively. The difference between an MCG split bearer and an SCG split bearer is eliminated inside a terminal.

Figure 11E:
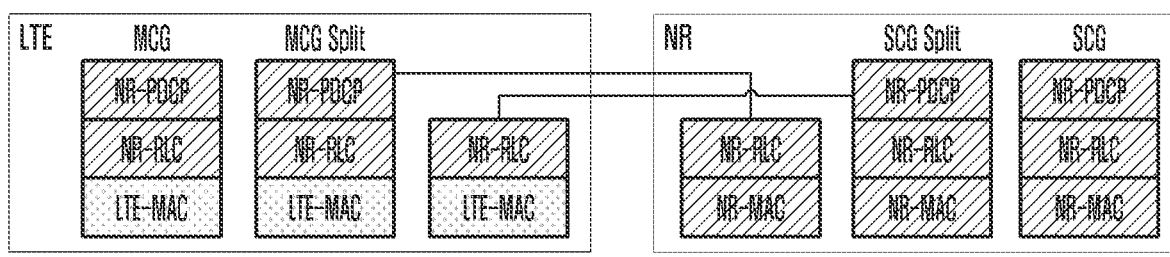

The embodiment of FIG. 11E illustrates an example in which all of the bearers in an NSA structure use NR-PDCP and NR-RLC.

An SCG/SCG split bearer using a secondary node (NR) base station/terminal as a PDCP anchor point always uses NR-PDCP. However, an MCG/MCG split bearer using a master node (LTE) base station/terminal as the PDCP anchor point may have to determine which PDCP is to be used. In this case, at the time of a bearer setup, a base station may notify a terminal of a protocol stack to be applied. Otherwise, in the case of an MCG split bearer or an MCG bearer using a master node as an anchor point, NR-PDCP may be used by default. Meanwhile, NR-PDCP may also be always used in an NSA structure in which a master node is LTE and a secondary node is NR.

Figure 12:
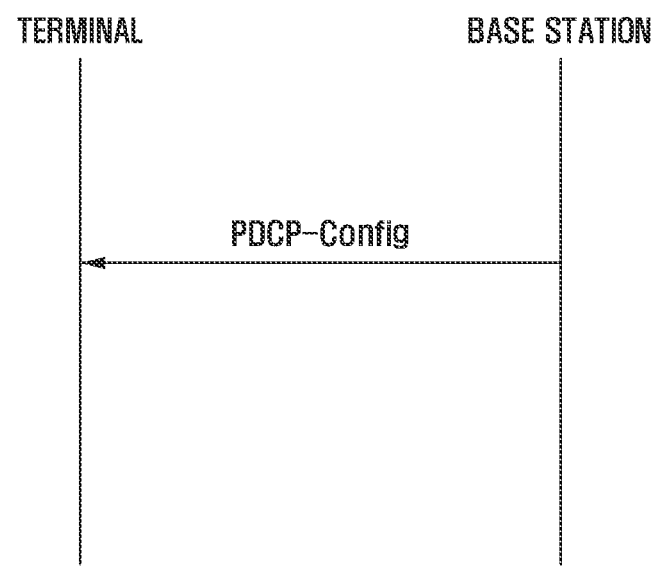
FIG. 12 illustrates a base station sending PDCP-Config to a terminal according to one embodiment of the disclosure.

FIG. 12 illustrates an example of a base station sending a PDCP-Config message to a terminal. A PDCP-Config may indicate which PDCP version is to be used by a PDCP layer, among NR-PDCP and LTE-PDCP. Similarly, RLC-Config may also be transmitted from a base station to a terminal. RLC-Config may also indicate which RLC version is to be used among NR-RLC and LTE-RLC.

In an embodiment, a base station may also notify a terminal whether a PDCP anchor point of the base station is a master node or a secondary node. In addition, a PDCP-Config may include information regarding: whether to apply integrity protection for a bearer using a master node as an anchor point; which integrity protection algorithm is to be applied; which algorithm for a security key is to be applied; whether to generate a security key using KeNB and S-KeNB; and the like.

Figure 13:
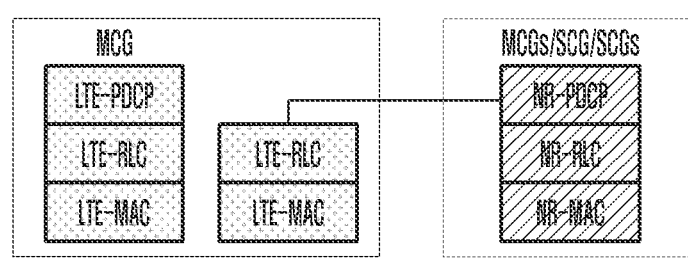
FIG. 13 illustrates a terminal implementation structure according to one embodiment of the disclosure.

FIG. 13 is an example of illustrating a terminal implementation structure in the case where an MCG split bearer applies NR-PDCP.

If the MCG split bearer (MCGs) uses NR-PDCP, the MCG split bearer has no structural difference from an SCG split bearer (SCGs) and thus can implement a PDCP anchor point an NR modem in a terminal.

FIGS. 14A, 14B, 14C, and 14D illustrate a method for generating a security key in an NSA structure.

In an NSA structure, a master node and a secondary node may have KeNB and S-KeNB values, respectively, and can generate a security key, such as KRRCint, KRRCenc, KUPenc, and the like, by applying the values to the key derivation algorithm. There may be an LTE key derivation algorithm and an NR key derivation algorithm in the NSA structure. A key may be generated using a combination of FIGS. 14A to 14D. It is assumed that a KUPenc key is generated in FIGS. 14A to 14D, but the combination may be equally applied to other security keys.

Figure 14A:
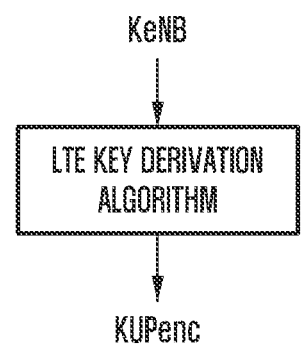
FIGS. 14A, 14B, 14C, and 14D illustrate a method for generating a security key in an NSA structure according to one embodiment of the disclosure.

FIG. 14A illustrates an embodiment of generating KUPenc by applying KeNB to an LTE key derivation algorithm.

Figure 14B:
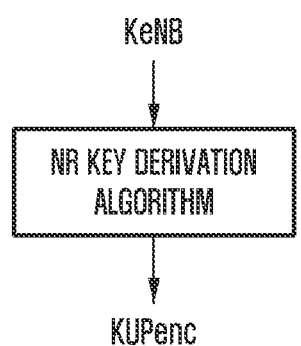

FIG. 14B illustrates an embodiment of generating KUPenc by applying KeNB to an NR key derivation algorithm.

Figure 14C:
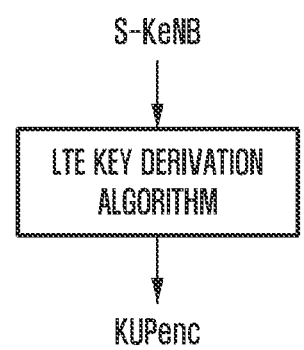

FIG. 14C illustrates an embodiment of generating KUPenc by applying S-KeNB to an LTE key derivation algorithm.

Figure 14D:
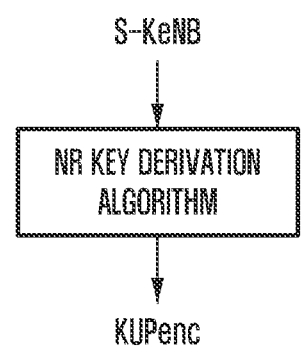

FIG. 14D illustrates an embodiment of generating KUPenc by applying S-KeNB to an NR key derivation algorithm.

In a bearer (bearer terminated by MN) using a master node of an NSA structure as a PDCP anchor point, the security key generation method illustrated in FIGS. 14A to 14D may be applied using at least one of the following methods:

applying KeNB to an LTE key derivation algorithm to generate KUPenc and applying the KUPenc to both NR-PDCP and LTE-PDCP;

applying KeNB to an NR key derivation algorithm to generate KUPenc and applying the KUPenc to both NR-PDCP and LTE-PDCP;

applying KeNB to an LTE key derivation algorithm to generate KUPenc1, applying the KUPenc1 to LTE-PDCP, and applying KeNB to an NR key derivation algorithm to generate KUPenc2 and applying the KUPenc2 to NR-PDCP;

applying KeNB to an LTE key derivation algorithm to generate KUPenc1, applying the KUPenc1 to LTE-PDCP, and applying S-KeNB to an LTE key derivation algorithm to generate KUPenc2 and applying the KUPenc2 to NR-PDCP;

applying KeNB to an LTE key derivation algorithm to generate KUPenc1, applying the KUPenc1 to LTE-PDCP, and applying S-KeNB to an LTE key derivation algorithm to generate KUPenc2 and applying the KUPenc2 to NR-PDCP;

applying KeNB or S-KeNB to an LTE key derivation algorithm to generate KUPenc and applying the KUPenc to both NR-PDCP and LTE-PDCP, wherein a base station or network provides notification as to whether to use the KeNB or the S-KeNB;

applying KeNB or S-KeNB to an NR key derivation algorithm to generate KUPenc and applying the KUPenc to both NR-PDCP and LTE-PDCP, wherein a base station or network provides notification as to whether to use the KeNB or the S-KeNB;

applying KeNB or S-KeNB to an LTE or NR key derivation algorithm to generate KUPenc and applying the KUPenc to both NR-PDCP and LTE-PDCP, wherein a base station or network provides notification as to whether to use the KeNB or the S-KenB, and the base station or network provides notification as to whether to use the LTE key derivation algorithm or the NR key derivation algorithm; and applying KeNB or S-KeNB to an LTE or NR key derivation algorithm to generate KUPenc and applying the KUPenc to both NR-PDCP and LTE-PDCP, wherein a default value on whether to use the KeNB or the S-KeNB may be preconfigured, and a default value on whether to use the LTE key derivation algorithm or the NR key derivation algorithm may be preconfigured.

NR-PDCP may also apply integrity protection to DRB. Integrity protection may be configured if a master node (LTE) supports NR-PDCP. In an embodiment, integrity protection may be released by default in the case where a split bearer using a master node as a PDCP anchor point uses NR-PDCP. In another embodiment, in the case where a split bearer using a master node as a PDCP anchor point uses NR-PDCP, whether to support integrity protection may be determined. In another embodiment, in the case where a split bearer using a master node as a PDCP anchor point uses NR-PDCP, a secondary node may be requested to determine whether to support integrity protection. In another embodiment, in the case where a split bearer using a master node as a PDCP anchor point uses NR-PDCP, whether to support integrity protection may be configured by PDCP-Config.

Figure 15A:
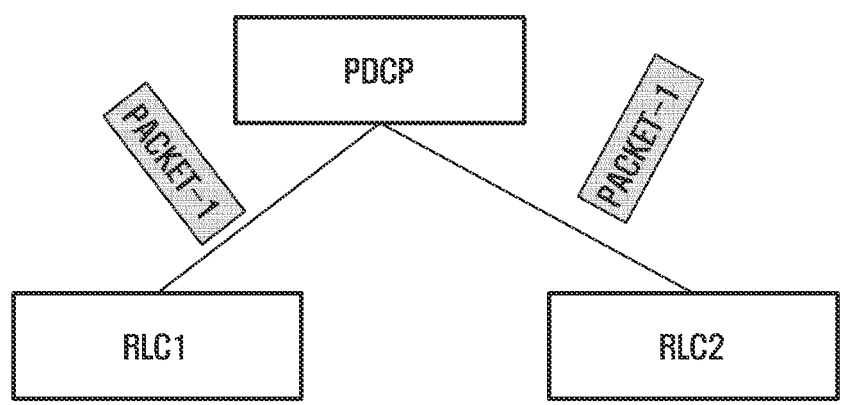
FIGS. 15A and 15B illustrates an example in which an integrity check may be determined to be a security attack according to one embodiment of the disclosure.
Figure 15B:
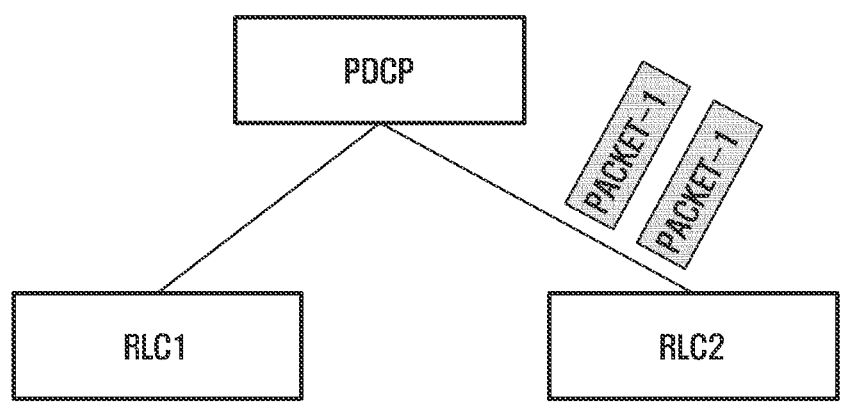

FIGS. 15A and 15B illustrates an example in which an integrity check may be determined to be a security attack.

In the case of a split bearer in FIG. 15A, a PDCP device may be connected to multiple RLC devices, and in the case where identical packets are received from the RLC devices, this may be determined to a security attack if duplicate packet transmission is not in an activated state.

In the case where identical packets are received from one RLC device in FIG. 15B, this may be determined to be a security attack regardless of whether or not duplicate packet transmission is activated.

Figure 16:
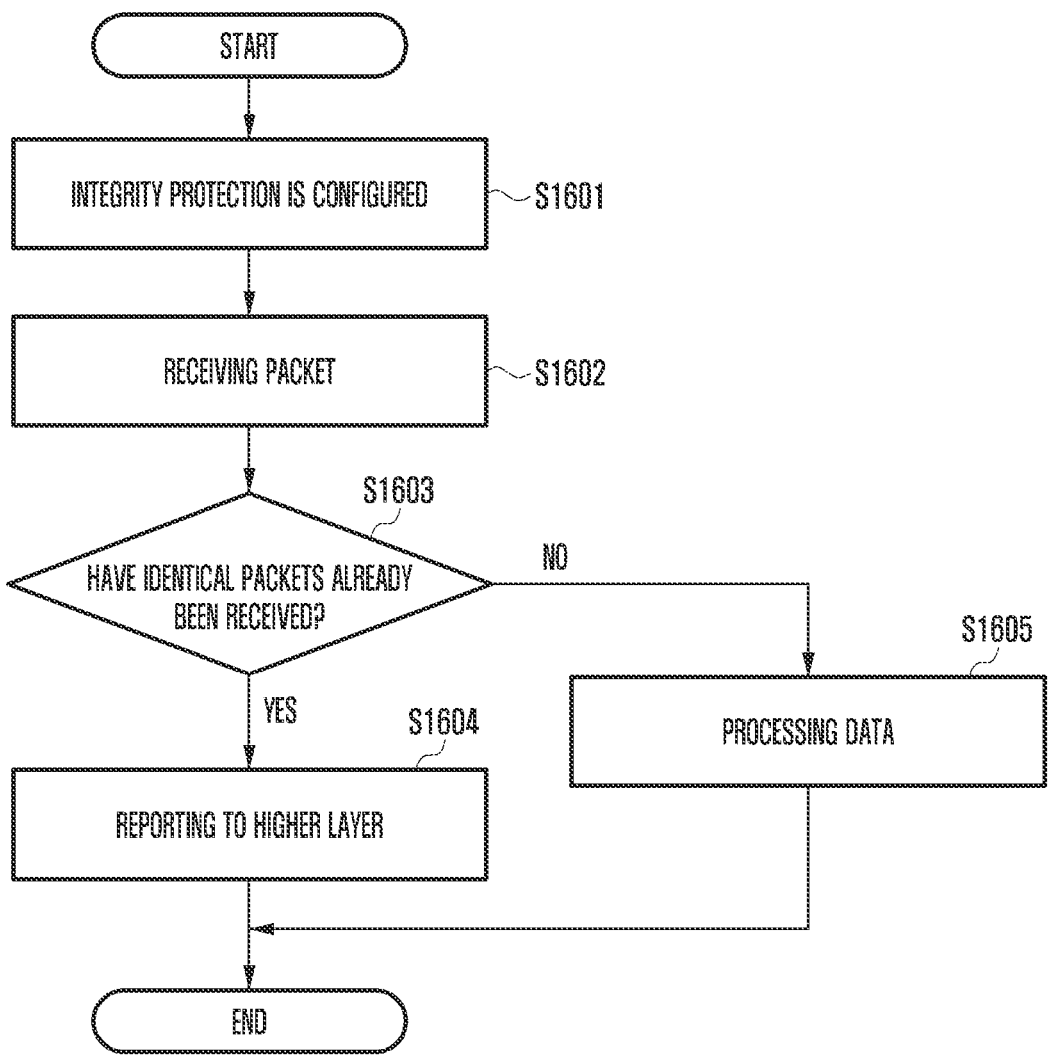
FIG. 16 shows an integrity checking operation in a bearer in which duplicate packet transmission is not allowed, according to one embodiment of the disclosure.

FIG. 16 shows an embodiment of an operation method for performing integrity checking in a bearer in which duplicate packet transmission is not allowed. The corresponding operation may also be applied in the case where duplicate packet transmission is deactivated. The operation method of FIG. 16 may be applicable to both SRB and DRB.

If integrity protection of a certain bearer is configured in S1601, whether or not identical packets have already been received whenever a packet is received in S1602 may be identified in S1603. In this case, "identical packet" may be one having an identical PDCP COUNT.

If identical packets have already been received, this may be determined to be a security attack in the state in which duplicate packet transmission is not allowed. In this case, a terminal may report to a higher layer or report, or may report to a base station in regard to this attack in S1604. In addition, a connection reconfiguration procedure may be performed on the basis on the report.

On the other hand, if no identical packets have already been received, the received data may be processed in S1605.

Figure 17:
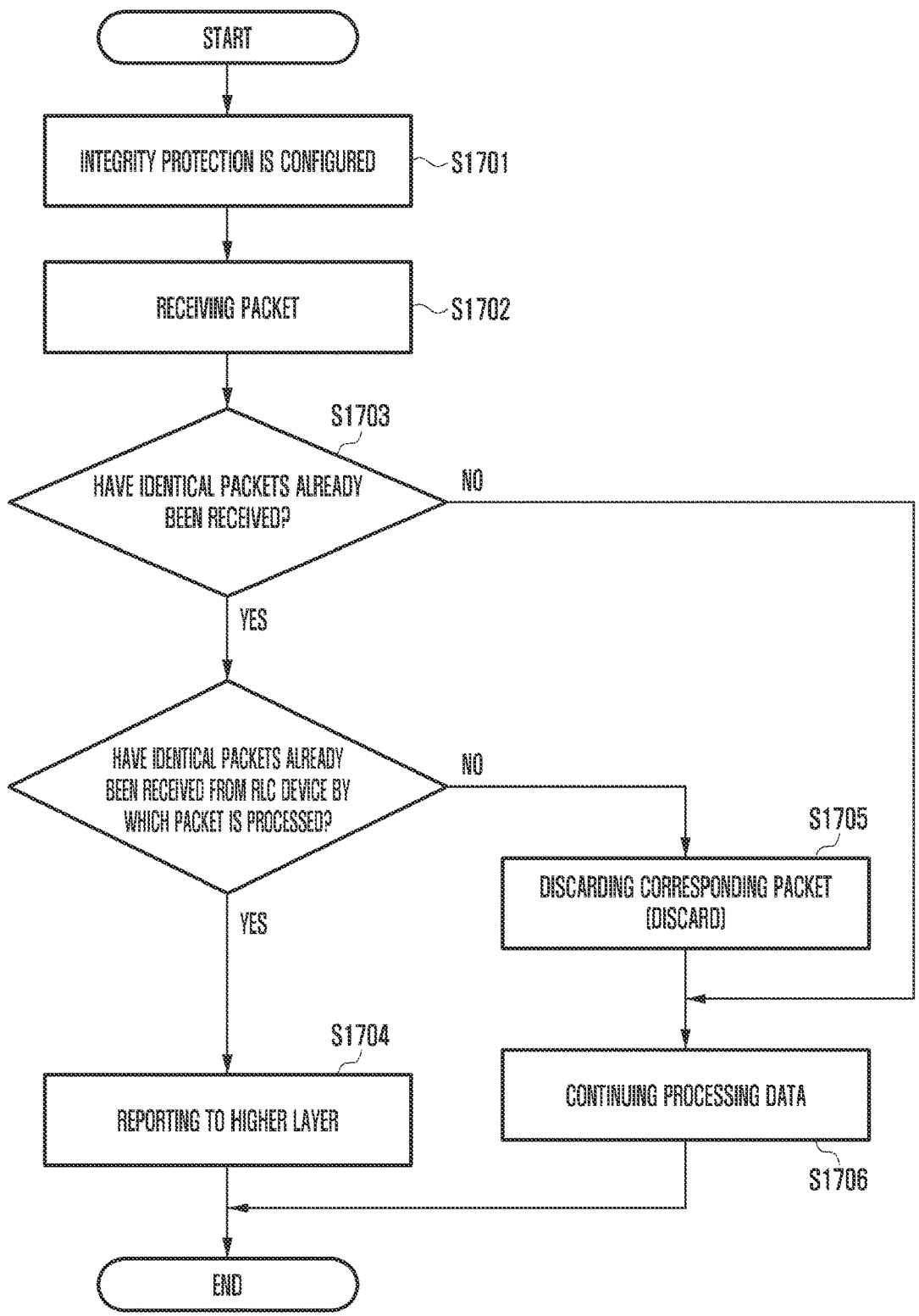
FIG. 17 shows an integrity checking operation in a bearer in which duplicate packet transmission is allowed, according to one embodiment of the disclosure.

FIG. 17 shows an operation method for performing integrity checking in a bearer in which duplicate packet transmission is allowed. The corresponding operation may not be applied in the case where duplicate packet transmission is deactivated. The operation method of FIG. 17 may be applicable to both SRB and DRB in which duplicate packet transmission is allowed.

If integrity protection of a certain bearer is configured in S1701, whether or not identical packets have already been received whenever a packet is received in S1702 may be identified in S1703. In this case, "identical packet" may be one having an identical PDCP COUNT.

If identical packets have already been received and are received from an identical RLC device, this may be determined to be a security attack. In this case, a terminal may report to a higher layer or may report to a base station in regard to this attack in S1704. In addition, a connection reconfiguration procedure may be performed on the basis on the report.

If identical packets are received but from different RLC devices, this may be determined to be normal duplicate packet transmission procedure. Thus, the corresponding packets are discarded in S1705 and then data processing (receiving) procedure may be continued in S1706.

Figure 18:
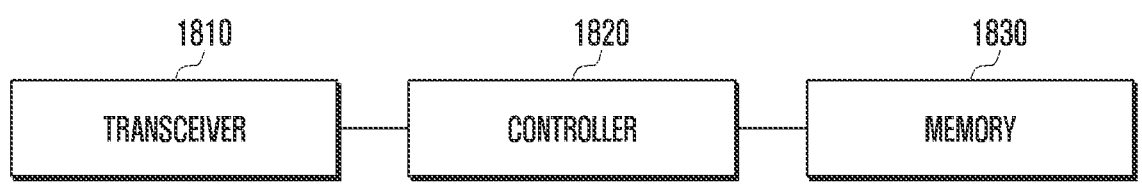
FIG. 18 illustrates a terminal structure according to one embodiment of the disclosure.

FIG. 18 illustrates a terminal structure according to one embodiment of the disclosure.

Referring to FIG. 18, a terminal may include a transceiver 1810, a controller 1820, and a memory 1830. In the disclosure, the controller may be defined as a circuit, an application-specific integrated circuit or at least one processor.

The transceiver 1810 may transmit and receive a signal with another network entity. For example, the transceiver 1810 may receive system information from a base station and may receive a synchronization signal or a reference signal.

The controller 1820 may control the overall operation of a terminal according to an embodiment proposed by the disclosure. For example, the controller 1820 may control signal flow between blocks to perform operation according to the flowchart described above.

The memory 1830 may store at least one of information transmitted and received through the transceiver 1810 and information generated through the controller 1820.

Figure 19:
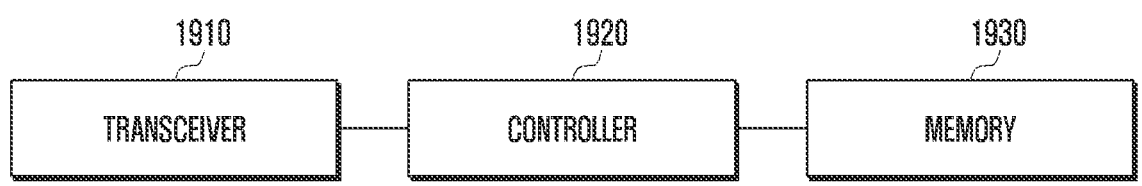
FIG. 19 illustrates a base station structure according to one embodiment of the disclosure.

FIG. 19 illustrates a base station structure according to one embodiment of the disclosure.

Referring to FIG. 19, a base station may include a transceiver 1910, a controller 1920, and a memory 1930. In the disclosure, the controller may be defined as a circuit, an application-specific integrated circuit or at least one processor.

The transceiver 1910 may transmit and receive a signal with another network entity. For example, the transceiver 1910 may receive system information from a terminal and may receive a synchronization signal or a reference signal.

The controller 1920 may control the overall operation of a base station according to an embodiment proposed by the disclosure. For example, the controller 1920 may control signal flow between blocks to perform operation according to the flowchart described above.

The memory 1930 may store at least one of information transmitted and received through the transceiver 1910 and information generated through the controller 1920.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

What is claimed is:

1. A method performed by a terminal in a wireless communication system, the method comprising:
    receiving, from a base station, first information indicating an activation of protocol data convergence protocol (PDCP) duplication;
    transmitting, to the base station, a first PDCP protocol data unit (PDU) on a first logical channel and a second PDCP PDU same as the first PDCP PDU on a second logical channel, based on the first information, wherein, based on logical channel mapping restrictions, a first packet corresponding to the first PDCP PDU from the first logical channel is only mapped to a first serving cell and a second packet corresponding to the second PDCP PDU from the second logical channel is only mapped to a second serving cell;
    identifying whether the second serving cell includes only a secondary cell (SCell), in case that a radio link control (RLC) entity corresponding to the second logical channel reaches a maximum number of retransmissions for the second PDCP PDU:
    in case that the second serving cell includes only the SCell, transmitting, to the base station, information on the second logical channel; and
    in case that the second serving cell includes a primary cell (PCell), detecting a radio link failure (RLF),
    wherein the logical channel mapping restrictions of the first logical channel and the second logical channel are not applied based on a deactivation of the PDCP duplication, and packets from the first logical channel and the second logical channel are mapped to any configured serving cell, in case that the logical channel mapping restrictions are not applied.

2. The method of claim 1,
    wherein configuration information for a master node (MN) terminated—master cell group (MCG) bearer is provided from the base station, based on evolved universal mobile telecommunication system (UMTS) terrestrial radio access (E-UTRA)—new radio (NR) dual connectivity (EN-DC) being supported by the terminal, and
    wherein a PDCP version is identified as one of a NR PDCP or an LTE PDCP based on the configuration information.

3. The method of claim 1,
    wherein the information on the second logical channel includes an identity of the second logical channel.

4. The method of claim 1,
    wherein the PDCP duplication is deactivated, in case that second information indicating the deactivation of the PDCP duplication is received, and
    wherein the first information and the second information are transmitted by a medium access control (MAC) control element (CE).

5. A method performed by a base station in a wireless communication system, the method comprising:
    transmitting, to a terminal, first information indicating an activation of protocol data convergence protocol (PDCP) duplication;
    receiving, from the terminal, a first PDCP protocol data unit (PDU) on a first logical channel and a second PDCP PDU same as the first PDCP PDU on a second logical channel, based on the first information, wherein, based on logical channel mapping restrictions, a first packet corresponding to the first PDCP PDU is only received on a first serving cell and a second packet corresponding to the second PDCP PDU is only received on a second serving cell; and
    receiving, from the terminal, information on the second logical channel, in case that the second serving cell includes only a secondary cell (SCell) and a radio link control (RLC) entity corresponding to the second logical channel in the terminal reaches a maximum number of retransmissions for the second PDCP PDU, wherein, in case that the second serving cell includes a primary cell (PCell) the RLC entity reaches the maximum number of retransmissions for the second PDCP PDU, radio link failure (RLF) is detected by the terminal,
    wherein the logical channel mapping restrictions of the first logical channel and the second logical channel are not applied based on a deactivation of the PDCP duplication, and packets corresponding to PDCP PDUs obtained from the first logical channel and the second logical channel are received on any configured serving cell, in case that the logical channel mapping restrictions are not applied.

6. The method of claim 5,
    wherein configuration information for a master node (MN) terminated—master cell group (MCG) bearer is provided to the terminal, based on evolved universal mobile telecommunication system (UMTS) terrestrial radio access (E-UTRA)— new radio (NR) (EN-DC) being supported by the terminal, and
    wherein a PDCP version is identified as one of a NR PDCP or an LTE PDCP based on the configuration information.

7. The method of claim 5,
    wherein the information on the second logical channel includes an identity of the second logical channel.

8. The method of claim 5,
    wherein the PDCP duplication is deactivated, in case that second information indicating the deactivation of the PDCP duplication is transmitted to the terminal, and
    wherein the first information and the second information are transmitted by a medium access control (MAC) control element (CE).

9. A terminal in a wireless communication system, the terminal comprising:
    a transceiver; and
    a controller configured to:
        control the transceiver to receive, from a base station, first information indicating an activation of protocol data convergence protocol (PDCP) duplication,
        control the transceiver to transmit, to the base station, a first PDCP protocol data unit (PDU) on a first logical channel and a second PDCP PDU same as the first PDCP PDU on a second logical channel, based on the first information, wherein, based on logical channel mapping restrictions, a first packet corresponding to the first PDCP PDU from the first logical channel is only mapped to a first serving cell and a second packet corresponding to the second PDCP PDU from the second logical channel is only mapped to a second serving cell, identify whether the second serving cell includes only a secondary cell (SCell), in case that a radio link control (RLC) entity corresponding to the second logical channel reaches a maximum number of retransmissions for the second PDCP PDU, in case that the second serving cell includes only the SCell, control the transceiver to transmit, to the base station, information on the second logical channel, and in case that the second serving cell includes a primary cell (PCell), detect a radio link failure (RLF), wherein the logical channel mapping restrictions of the first logical channel and the second logical channel are not applied based on a deactivation of the PDCP duplication, and packets from the first logical channel and the second logical channel are mapped to any configured serving cell, in case that the logical channel mapping restrictions are not applied.

10. The terminal of claim 9,
wherein configuration information for a master node (MN) terminated—master cell group (MCG) bearer is provided from the base station, based on evolved universal mobile telecommunication system (UMTS) terrestrial radio access (E-UTRA)— new radio (NR) dual connectivity (EN-DC) being supported by the terminal, and wherein a PDCP version is identified as one of a NR PDCP or an LTE PDCP based on the configuration information.

11. The terminal of claim 9,
wherein the information on the second logical channel includes an identity of the second logical channel.

12. The terminal of claim 9,
wherein the PDCP duplication is deactivated, in case that second information indicating the deactivation of the PDCP duplication is received, and wherein the first information and the second information are transmitted by a medium access control (MAC) control element (CE).

13. A base station in a wireless communication system, the base station comprising:
a transceiver; and
a controller configured to:
control the transceiver to transmit, to a terminal, first information indicating an activation of protocol data convergence protocol (PDCP) duplication, control the transceiver to receive, from the terminal, a first PDCP protocol data unit (PDU) on a first logical channel and a second PDCP PDU same as the first PDCP PDU on a second logical channel, based on the first information, wherein, based on logical channel mapping restrictions, a first packet corresponding to the first PDCP PDU is only received on a first serving cell and a second packet corresponding to the second PDCP PDU is only received on a second serving cell, and control the transceiver to receive, from the terminal, information on the second logical channel, in case that the second serving cell includes only a secondary cell (SCell) and a radio link control (RLC) entity corresponding to the second logical channel in the terminal reaches a maximum number of retransmissions for the second PDCP PDU, wherein, in case that the second serving cell includes a primary cell (PCell) the RLC entity reaches the maximum number of retransmissions for the second PDCP PDU, radio link failure (RLF) is detected by the terminal, wherein the logical channel mapping restrictions of the first logical channel and the second logical channel are not applied based on a deactivation of the PDCP duplication, and packets corresponding to PDCP PDUs obtained from the first logical channel and the second logical channel are received on any configured serving cell, in case that the logical channel mapping restrictions are not applied.

14. The base station of claim 13,
wherein configuration information for a master node (MN) terminated—master cell group (MCG) bearer is provided to the terminal, based on evolved universal mobile telecommunication system (UMTS) terrestrial radio access (E-UTRA)— new radio (NR) (EN-DC) being supported by the terminal, and wherein a PDCP version is identified as one of a NR PDCP or an LTE PDCP based on the configuration information.

15. The base station of claim 13,
wherein the information on the second logical channel includes an identity of the second logical channel.

16. The base station of claim 13,
wherein the PDCP duplication is deactivated, in case that second information indicating the deactivation of the PDCP duplication is transmitted to the terminal, and wherein the first information and the second information are transmitted by a medium access control (MAC) control element (CE).

* * * * *